Jan. 5, 1954   A. S. BERG ET AL   2,665,146
PIPE FASTENING MEANS
Filed Feb. 7, 1950
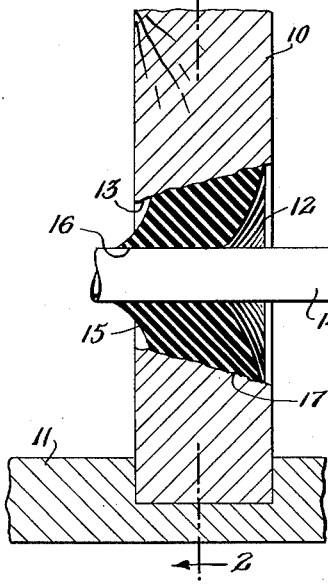
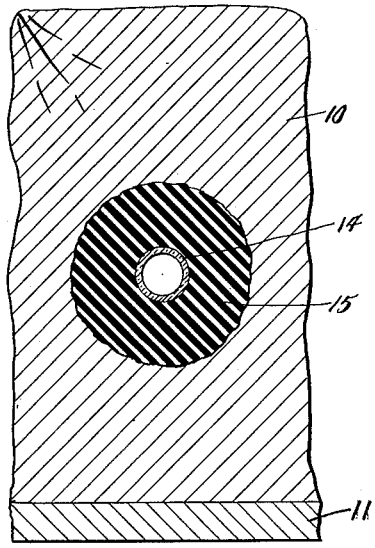
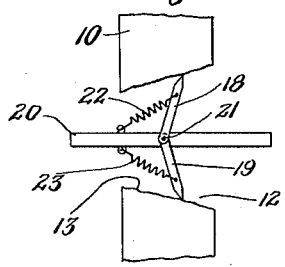
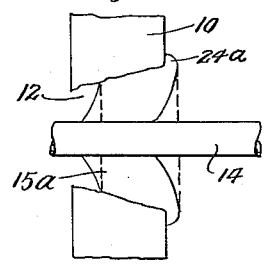
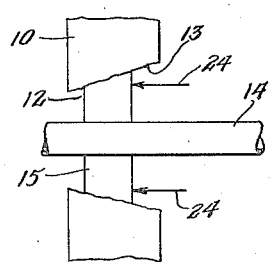
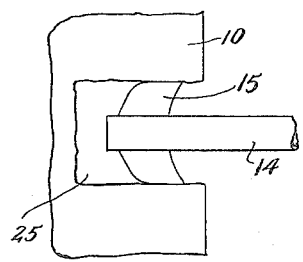
INVENTORS
ABRAM S. BERG
ARSENIUS N. GOREGLIAD
BY
Woodcock and Phelan
ATTORNEYS Patented Jan. 5, 1954

2,665,146

UNITED STATES PATENT OFFICE 2,665,146

PIPE FASTENING MEANS

Abram S. Berg and Arsenius N. Goregliad,
Wyncote, Pa.

Application February 7, 1950, Serial No. 142,841

1 Claim. (Cl. 285—30)

This invention relates to fastening and it relates particularly to the permanent fastening together of two objects by elastic coupling means. The invention is peculiarly useful for permanently and securely fastening glass pipe or tubing in a wall structure such as the wall of a wooden drum or tank. It may be utilized where only one side of the wall is accessible, and it is effective even where the hole in the wall becomes distorted by the unequal swelling of the wood along and across its grain.

Permanent fastening means have heretofore been devised for fastening bolts or similar objects to walls having only one side accessible by boring a hole into or through the wall and fastening the bolt therein in various ways. Such fasteners have been highly useful for some purposes but they are not useful where flexible fastening is required such for example as where it is desired to have a pipe yieldably supported or where because of fragility glass pipe or the like might be broken by the permanent fastening means heretofore known. Moreover, in certain chemical processes it is not permissible to have any metal in contact with the contents of the pipe or tank, or even any nonmetallic substance other than the wood, the glass, and the inert, rubber-like substance of which the elastic coupling means is made in accordance with the invention.

On the other hand, glass tubing has been temporarily supported in containers of various kinds by means of rubber stoppers having suitable central holes for the glass tubing. Fastening glass tubing by these rubber stoppers has not been sufficiently permanent or secure for some purposes since the stopper or the glass tubing could be removed by about the same force employed to insert it. In some cases it has been undesirable to cement the rubber stopper in place, or to cement the glass tubing thereto, for various reasons among which are the possibility of undesirable chemical reaction between the reagents of a chemical process and the cement when the glass tubing or pipe forms part of a chemical installation. No generally satisfactory cement is available.

In accordance with the invention, and as an object thereof, elongated members, such as glass pipes, are securely and permanently fastened in an aperture in a wall structure by correctly applying a fastener which superficially resembles an ordinary bottle stopper but which functions quite differently. This object is achieved, in one respect, by so distorting the fastener when it and the glass pipe are inserted into an aperture in the wall structure that thereafter the fastener functions like a toggle joint to prevent removal thereof or of the glass tube.

A further object of the invention is to permanently and securely fasten a glass tube, or similar member, in a wall structure by cheap and simple means that can be applied quickly by unskilled personnel without danger of subsequent loosening or leakage.

Other objects and advantages of the invention will be apparent from the following more detailed description thereof with reference to the accompanying drawings, in which:

Fig. 1 is a vertical sectional view of apparatus embodying the invention;

Fig. 2 is a fragmentary sectional view taken along the line 2—2 in Fig. 1;

Figs. 3, 4 and 5 are small-scale diagrammatic views useful in explaining the invention; and Fig. 6 is a small-scale diagrammatic view of a modification of the structure shown in Fig. 1.

Wall structure 10 may, by way of example, be considered to be a portion of a wood stave forming part of a tank 11. Aperture 12 in wall 10 flares outwardly and may have a roughened inner surface 13. Aperture 12 is shown substantially larger than the glass tube or pipe 14 which is to be fastened therein for clearness, but it will be understood that the walls of fastener 15 may be quite thin. The use of thin-walled fasteners may be advantageous where a glass pipe is to be fastened in a narrow wooden stave that would be weakened unduly by an aperture large enough to accommodate a fastener having thicker walls.

Fastener 15 has an internal bore 16 extending centrally therethrough and preferably of an initial diameter slightly less than the outside diameter of pipe 14. Outside surface 17 of fastener 15 preferably is tapered to correspond to the tapered inner surface of aperture 12 but it may be untapered, if desired, provided it is sufficiently pliable to conform to roughened surface 13 under pressure.

Inasmuch as glass pipes exemplified by pipe 14 are commonly used in manufacturing processes where various chemicals flow therethrough fastener 15 should be made of a suitable material that will not react with the particular chemical with which it will be in contact. A moderately soft grade of rubber will be satisfactory in some cases while a synthetic rubber such as Neoprene or the material commonly known as Ameripol D-24 may be more generally useful.

Referring to Figs. 1 and 2 wherein distortion of fastener 15 is shown somewhat exaggerated for clearness, the smallest uncompressed outside diameter of fastener 15 may be about the same as the middle diameter of aperture 12. Pipe 14, preferably having been lubricated with some substance such as glycerin or a suitable silicone product, may be inserted in bore 16 of fastener 15 which then may be inserted about halfway through wall 10 under moderate pressure. Greater force may then be applied to pipe 14, by any suitable means such as a lever or hydraulic jack, not shown, to force fastener 15 to its final position.

Pipe 14 should fit snugly enough in bore 16, either because it was made with a sufficiently large outer diameter or because bore 16 was sufficiently reduced in size by forcing fastener 15 into aperture 12, so that fastener 15 will be stretched and distorted inwardly at its central portion somewhat more than the final amount. When pipe 14 is released after thus being forced with fastener 15 into aperture 12, it will spring back slightly outwardly of wall 10 to a configuration of fastener 15 such as that shown in Fig. 1, but it cannot spring back further because the rigidity of pipe 14 and the peripheral compression of aperture 12 will limit and restrain the natural tendency of the fastener to resume its original shape. Any attempt to withdraw pipe 14 or fastener 15 from aperture 12 will merely increase this internal contraction against pipe 14 and the peripheral compression against wall 10. Leakage around the pipe is effectively prevented.

It will be apparent that fastener 15 need not have exact dimensions, in accordance with the invention, since it may be made to conform properly to aperture 12 and pipe 14 merely by pressing it into the tapered aperture far enough for it to grip pipe 14 properly before force is applied to the pipe to finally position it and fastener 15. This avoidance of the need for precision leads to inexpensive fasteners that may be applied easily.

Tensional strains in fastener 15, except possible circumferential tension, are relieved when pipe 14 is released leaving fastener 15 in radial compression, however, which compression will greatly increase if an attempt is made to withdraw pipe 14 toward the right, as seen in Fig. 1, thereby effectively preventing the removal of pipe 14. It will be apparent that the same increase in radial compression forces which causes fastener 15 to grip pipe 14 to prevent its removal also expands fastener 15 in aperture 12 to effectively prevent its removal from wall 10 even though fastener 15 should be somewhat larger or smaller than its intended diameter.

The roughness of surface 13 tends to retain fastener 15 in aperture 12 under the great outward radial force exerted thereon, in accordance with the invention, when an attempt is made to withdraw pipe 14 without, however, greatly interfering with pressing the pipe and fastener 15 into aperture 12 at which time the stretching inwardly of the central portion of fastener 15 tends to reduce the outer diameter thereof.

Referring to Fig. 3 the operation of the invention resembles to a certain extent the operation of the common toggle joint comprising members 18 and 19 hingedly secured to bar 20 by pin 21 and urged outwardly by springs 22 and 23, respectively. It is apparent that bar 20 readily might be moved to the left, as seen in Fig. 3, thereby pressing together members 18 and 19 by the decreasing diameter of aperture 12. If an attempt should be made to move bar 20 toward the right, as seen in Fig. 3, members 18 and 19 would thrust outwardly against surface 13 at the same time bearing inwardly at pin 21 thereby preventing any substantial movement to the right of the bar 20.

Although the preceding paragraph helps in a general way to explain the operation of the invention, the substitution, in accordance therewith, of a rubber-like fastener for members 18 and 19 and a glass pipe for bar 20 results in more complex operation. In the first place, fastener 15 being elastic instead of rigid, as members 18 and 19 are assumed to be, pipe 14 is yieldably held thereby and will not easily be broken by slight relative movement thereof with respect to wall 10 due to vibration or shock. Nevertheless fastener 15 readily may be so proportioned that it will not be moved past center by any ordinary force tending to remove pipe 14 from wall 10. Of course, if fastener 15 should be so proportioned that it may be moved past center so that it would be outwardly distorted by an outward force on pipe 14, the pipe would thereby be released.

Furthermore it should be noted that in order to secure the above-mentioned toggle-joint action of fastener 15, it is stretched and distorted by thrusting pipe 14 inwardly of aperture 12 and at the same time, while fastener 15 is so stretched and distorted, it moves inwardly to a smaller diameter of aperture 12 to confine it circumferentially and prevent its springing back to its original shape when the inward force on pipe 14 is released. For example, referring to Fig. 4, if a shoulder 24a were provided on a fastener 15a to prevent its moving inwardly in aperture 12 under a force exerted on pipe 14, fastener 15a might be stretched and distorted very much like fastener 15 but upon release of the inward force on pipe 14 it would spring back to its original configuration, shown by dotted lines in Fig. 4, and pipe 14 or fastener 15a could be withdrawn with the application thereupon of a force about equal and opposite to that which inserted it.

In accordance with the invention it is contemplated that pipe 14 shall be held in wall 10 by something more than the ordinary radial forces exerted on a tapered bottle stopper, the ordinary radial compressive forces being magnified many fold by the above-described toggle-joint action. Such toggle-joint action will be secured if fastener 15 be stretched and distorted inwardly as it is forced along the narrowing diameter of aperture 12. The aforesaid toggle-joint action will not be secured if fastener 15 be forced into aperture 12 by force applied to the outer portion thereof, instead of to the inner portion as by application of inward force to pipe 14.

Referring to Fig. 5, fastener 15 might be inserted into aperture 12 by forces applied substantially at the points indicated by arrows 24 without the stretching and inward distortion illustrated in Fig. 1. Thus the only force tending to hold pipe 14 would be the radial compressive forces produced by forcing fastener 15 into aperture 12, like a bottle stopper, without any toggle-joint action. Experience has shown that this kind of fastening is not secure and permanent enough for many purposes.

While a preferred form of the invention has been illustrated and described it will be understood that modifications thereof may be made within the spirit and scope of the invention as set forth in the appended claims. Particularly it will be apparent that aperture 12 need not extend entirely through wall 10; it may be a blind pocket 25, as shown in Fig. 6, or the pocket may be interconnected with other passageways, not shown. Likewise the walls of pocket 25 need not flare outwardly provided fastener 15 is so proportioned that it will be distorted inwardly a substantial amount as it is forced into pocket 25 to produce the above-described toggle-joint action. However, the preferred construction includes tapered walls of pocket 25 or aperture 12 since, as mentioned, fastener 15 may then deviate considerably from its intended size.

What is claimed is:

An arrangement for permanently fastening a pipe member in an aperture in a wall structure comprising in combination, a wall structure having a substantially unyieldable outwardly diverging internal wall surface defining an aperture, an elongated compressible elastic fastener extending coaxially in said aperture and engaging said outwardly diverging internal wall surface in fluid-tight relation, said fastener having opposed surfaces at its ends and a passageway extending therethrough in substantially concentric relation with said outwardly diverging internal wall surface, and a pipe extending through said passageway in fluid-tight contact with its surface throughout the length of said passageway, said fastener being distorted by compressive forces and said surfaces at the ends of said fastener having an outwardly divergent relation with respect to said pipe, both of said end surfaces being outwardly divergent to the same side of said wall structure as the outwardly diverging internal wall surface of said aperture, said end surfaces of said fastener having moved to the latter position during insertion of said fastener and said pipe into said aperture from a former position before said insertion where said surfaces at the ends of said fastener were substantially perpendicular to the axis of said pipe, and said fastener after said insertion being distorted inwardly with said end surfaces diverging outwardly to set up compressive forces acting between the periphery of said fastener and said internal wall surface and to set up compressive forces acting between the periphery of said pipe and said surface of said passageway, said compressive forces acting together to serve as the sole means of preventing withdrawal of said pipe and said fastener from said aperture.

ABRAM S. BERG.
ARSENIUS N. GOREGLIAD.

References Cited in the file of this patent

UNITED STATES PATENTS

| Number | Name | Date |
|---|---|---|
| 196,370 | Macqueen | Oct. 23, 1877 |
| 1,898,708 | Barnes | Feb. 21, 1933 |
| 2,047,976 | Lord | July 21, 1936 |